(12) United States Patent
Bufe et al.

(10) Patent No.: US 9,286,291 B2
(45) Date of Patent: Mar. 15, 2016

(54) DISAMBIGUATION OF DEPENDENT REFERRING EXPRESSION IN NATURAL LANGUAGE PROCESSING

(71) Applicant: International Business Machines Corporation, Armonk, NY (US)

(72) Inventors: John P. Bufe, Washington, DC (US); Donna Karen Byron, Boston, MA (US); Alexander Pikovsky, Laxington, MA (US); Edward E. Seabolt, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 351 days.

(21) Appl. No.: 13/768,136

(22) Filed: Feb. 15, 2013

(65) Prior Publication Data

US 2014/0236569 A1 Aug. 21, 2014

(51) Int. Cl.
*G06F 17/28* (2006.01)
*G06F 17/24* (2006.01)
*G06F 17/27* (2006.01)

(52) U.S. Cl.
CPC ............. *G06F 17/28* (2013.01); *G06F 17/24* (2013.01); *G06F 17/274* (2013.01); *G06F 17/278* (2013.01); *G06F 17/2775* (2013.01); *G06F 17/2795* (2013.01)

(58) Field of Classification Search
CPC ..... G06F 17/28; G06F 17/24; G06F 17/2795; G06F 17/274; G06F 17/278; G06F 17/2775
USPC .......................................................... 704/9
See application file for complete search history.

(56) References Cited

U.S. PATENT DOCUMENTS

| 5,774,845 | A  | * | 6/1998 | Ando ..................... G06F 17/271 704/231 |
| 6,205,456 | B1 | * | 3/2001 | Nakao ................ G06F 17/30719 707/999.003 |
| 6,295,542 | B1 | * | 9/2001 | Corbin .................... G06F 17/21 715/205 |
| 6,353,824 | B1 | * | 3/2002 | Boguraev .............. G06F 17/214 704/9 |

(Continued)

OTHER PUBLICATIONS

Srinivasan et al; "Cross document person name disambiguation using entity profiles", 2009, Association for the advancement of Artificial Intelligence.

(Continued)

*Primary Examiner* — Tammy Pham
*Assistant Examiner* — Edwin S Leland, III
(74) *Attorney, Agent, or Firm* — Garg Law Firm, PLLC; Rakesh Garg; Reza Sarbakhsh

(57) ABSTRACT

A system, and computer program product for disambiguation of dependent referring expression in natural language processing are provided in the illustrative embodiments. A portion of a document in a set of document is selected, the portion including a set of dependent referring expression instances. The portion is filtered to identify an instance from a set of dependent referring expression instances by using a linguistic characteristic of the instance, the instance of dependent referring expression referring to a full expression occurring in the set of documents. The full expression is located in one member document in the set of documents by locating where the dependent referring expression is defined to be a stand-in for the full expression. The instance is resolved using the full expression such that information about the full expression is available at a location of the instance.

8 Claims, 7 Drawing Sheets

(56) References Cited

U.S. PATENT DOCUMENTS

| | | | | |
|---|---|---|---|---|
| 7,398,196 | B1* | 7/2008 | Liu | G06F 17/2745 704/1 |
| 7,610,190 | B2* | 10/2009 | Polanyi | G06F 17/30719 704/9 |
| 8,155,950 | B1* | 4/2012 | Bickerstaff | G06F 17/2735 704/10 |
| 8,447,758 | B1* | 5/2013 | Adler | G06F 17/3053 707/722 |
| 8,782,042 | B1* | 7/2014 | Cooke | G06F 17/30572 707/729 |
| 2002/0002680 | A1* | 1/2002 | Carbajal | H04L 9/3247 713/180 |
| 2002/0173946 | A1 | 11/2002 | Christy | |
| 2003/0061201 | A1* | 3/2003 | Grefenstette | G06F 17/30011 |
| 2004/0088351 | A1* | 5/2004 | Liu | G06F 17/2235 709/203 |
| 2004/0205448 | A1* | 10/2004 | Grefenstette | G06F 17/30867 715/230 |
| 2005/0216443 | A1* | 9/2005 | Morton | G06F 17/3002 |
| 2005/0289446 | A1* | 12/2005 | Moncsko | G06F 17/30882 715/208 |
| 2006/0026203 | A1* | 2/2006 | Tan | G06F 17/277 |
| 2006/0136352 | A1* | 6/2006 | Brun | G06F 17/2755 |
| 2006/0206307 | A1* | 9/2006 | Sugihara | G06F 17/279 704/4 |
| 2006/0230346 | A1* | 10/2006 | Bhogal | G06F 17/2735 715/205 |
| 2006/0282414 | A1* | 12/2006 | Sugihara | G06F 17/30654 |
| 2007/0022115 | A1* | 1/2007 | Warburton | G06F 17/2765 |
| 2007/0106493 | A1* | 5/2007 | Sanfilippo | G06F 17/2785 704/9 |
| 2007/0192355 | A1* | 8/2007 | Vasey | G06F 17/21 |
| 2007/0192688 | A1* | 8/2007 | Vasey | G06F 17/243 715/210 |
| 2008/0096175 | A1* | 4/2008 | du Toit | G09B 5/062 434/308 |
| 2008/0098026 | A1* | 4/2008 | Kraft | G06F 17/3061 |
| 2008/0177725 | A1* | 7/2008 | Bravery | G06F 17/30731 |
| 2009/0061399 | A1* | 3/2009 | Freeman | G09B 7/00 424/157 |
| 2009/0076799 | A1* | 3/2009 | Crouch | G06F 17/2785 704/9 |
| 2009/0326919 | A1* | 12/2009 | Bean | G06F 17/2775 704/9 |
| 2009/0326924 | A1* | 12/2009 | Crider | G06F 17/2785 704/9 |
| 2010/0107045 | A1* | 4/2010 | Filippova | G06F 17/2235 715/205 |
| 2011/0010163 | A1* | 1/2011 | Jansen | G06F 17/271 704/9 |
| 2011/0106807 | A1* | 5/2011 | Srihari | G06F 17/30604 707/739 |
| 2011/0137636 | A1* | 6/2011 | Srihari | G06F 17/2863 704/2 |
| 2011/0179034 | A1* | 7/2011 | Takamatsu | G06F 17/2715 707/738 |
| 2011/0246181 | A1* | 10/2011 | Liang | G06F 17/2775 704/9 |
| 2011/0295594 | A1* | 12/2011 | Cai | G06F 17/278 704/9 |
| 2012/0183935 | A1* | 7/2012 | Hamada | G06F 17/2755 434/167 |
| 2013/0007607 | A1* | 1/2013 | Caldwell | G06F 17/2276 715/259 |
| 2013/0198596 | A1* | 8/2013 | Angelillo | G06F 17/211 715/205 |
| 2013/0311467 | A1* | 11/2013 | Galle | G06F 17/278 707/737 |
| 2014/0039877 | A1* | 2/2014 | Guenigault | G06F 17/21 704/9 |
| 2014/0237355 | A1* | 8/2014 | Bufe | G06F 17/28 715/256 |

OTHER PUBLICATIONS

Sumitra et al; "Automatic Extraction of Entity Alias from the Web", International Journal of Applied Information Systems (IJAIS), Foundation of Computer Science FCS, New York, vol. 3, No. 8, pp. 5-9, Aug. 2012.

* cited by examiner

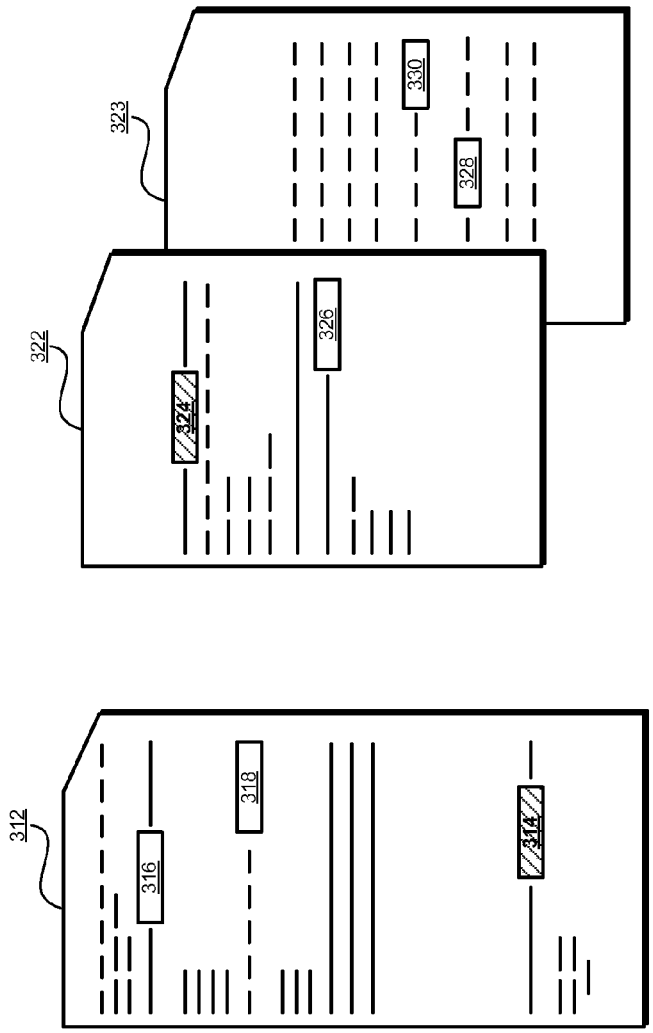
FIG. 3
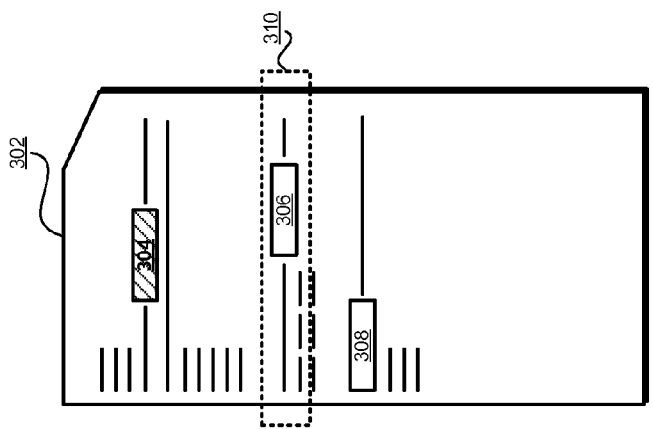

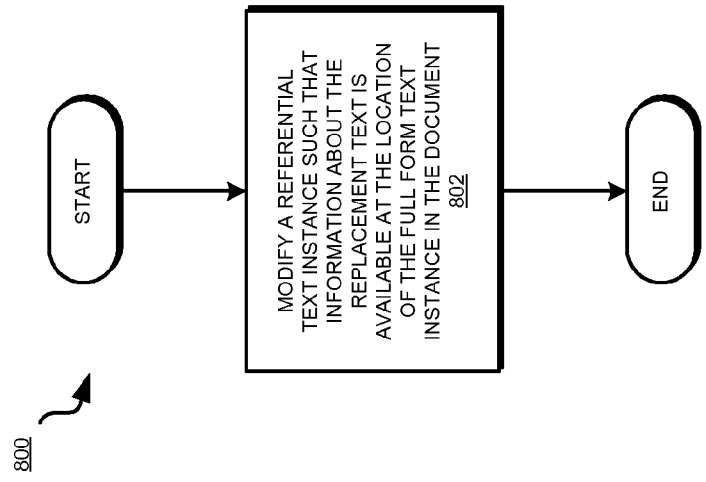
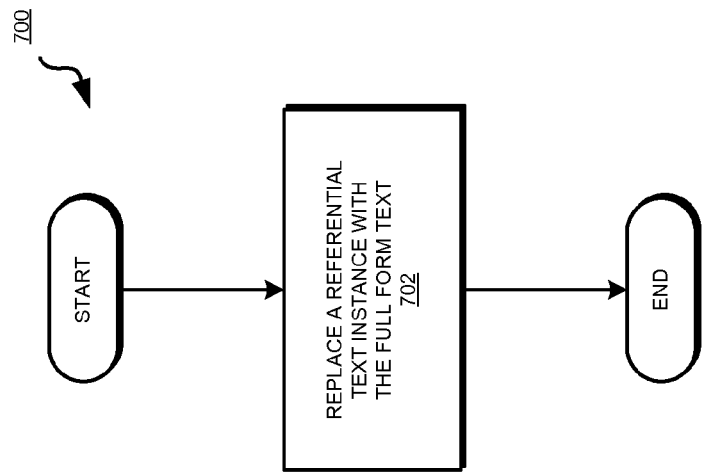

DISAMBIGUATION OF DEPENDENT REFERRING EXPRESSION IN NATURAL LANGUAGE PROCESSING

BACKGROUND

1. Technical Field

The present invention relates generally to a system, and computer program product for natural language processing of documents. More particularly, the present invention relates to a system, and computer program product for disambiguation of dependent referring expression in natural language processing.

2. Description of the Related Art

Documents include information in many forms. For example, textual information arranged as sentences and paragraphs conveys information in a narrative form.

Some types of information are presented in a referential form. For example, a document can include a name, a word, a phrase, or a text segment that occurs repeatedly in the document. Many documents designate a replacement phrase or text to stand-in for the name, word, phrase, or text segment, and use the replacement text for each subsequent occurrence of the name, word, and phrase or text segment after the first occurrence.

The name, a word, phrase, or text segment is called full expression or full expression, and the replacement phrases or text are called dependent referring expression. The dependent referring expression is intended to convey the meaning of the full expression for which the dependent referring expression stands-in.

Natural language processing (NLP) is a technique that facilitates exchange of information between humans and data processing systems. For example, one branch of NLP pertains to transforming a given content in a human-usable language or form to a computer usable form. For example, NLP can accept a document whose content is in a human-readable form, and produce a document whose corresponding content is in a computer-specific language or form.

SUMMARY

The illustrative embodiments provide a system, and computer program product for disambiguation of dependent referring expression in natural language processing. At least one embodiment selects a portion of a document in a set of documents, the portion including a set of dependent referring expression instances. The embodiment filters the portion to identify an instance from a set of dependent referring expression instances by using a linguistic characteristic of the instance, the instance of dependent referring expression referring to a full expression occurring in the set of documents. The embodiment locates the full expression in one member document in the set of documents by locating where the dependent referring expression is defined to be a stand-in for the full expression. The embodiment resolves, using a processor and a memory, the instance using the full expression such that information about the full expression is available at a location of the instance.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts several examples of dependent referring expressions that can be resolved in accordance with an illustrative embodiment;

FIG. 7 depicts a flowchart of one example manner of resolving a dependent referring expression instance in accordance with an illustrative embodiment; and FIG. 8 depicts a flowchart of one example manner of resolving a dependent referring expression instance in accordance with an illustrative embodiment.

DETAILED DESCRIPTION

Figure 1:
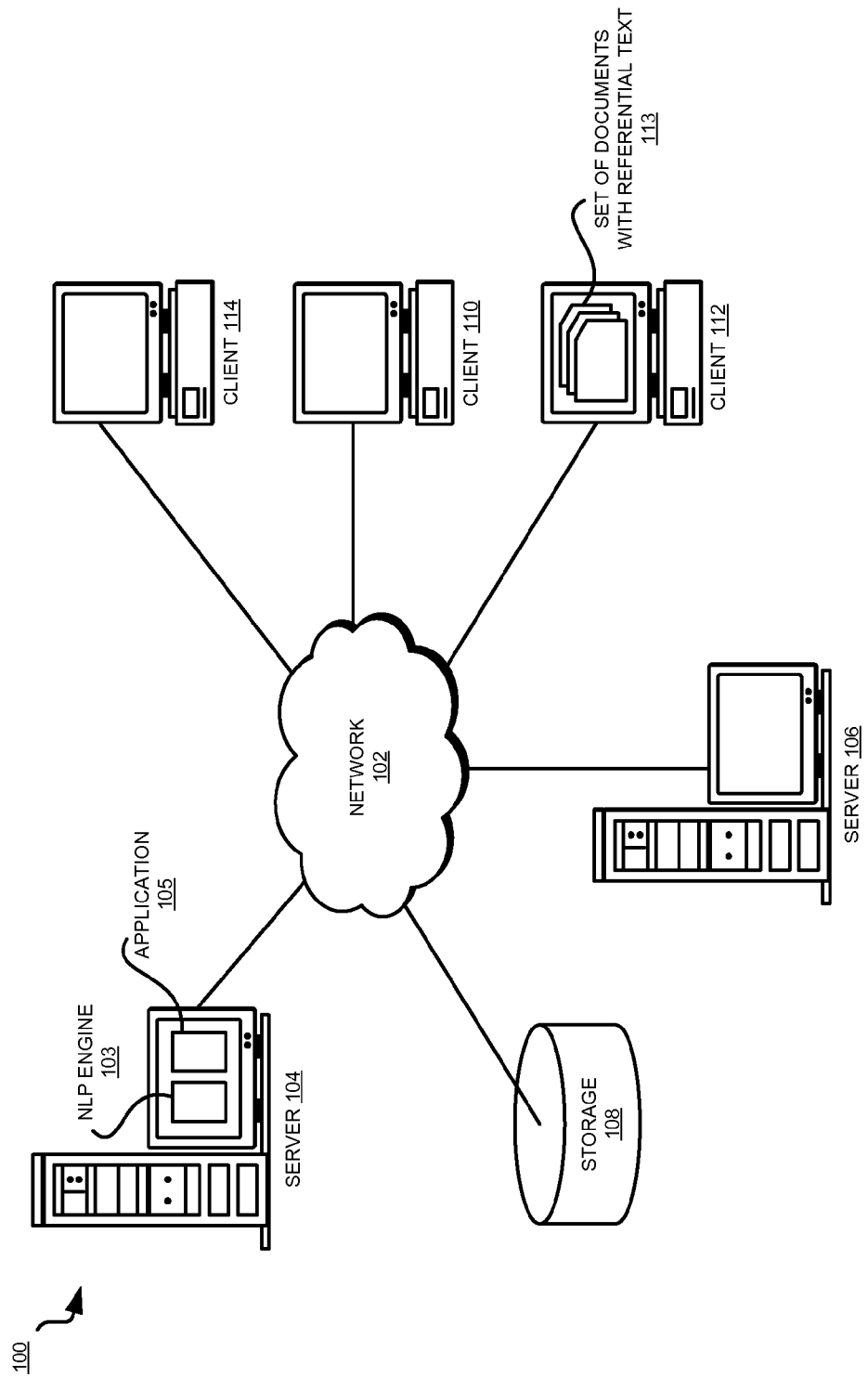
FIG. 1 depicts a pictorial representation of a network of data processing systems in which illustrative embodiments may be implemented.

The illustrative embodiments recognize that documents subjected to NLP commonly include dependent referring expressions, to wit, text that stands-in for some full expression occurring somewhere in the documents. For example, the illustrative embodiments recognize that in some cases the full expression may appear towards the beginning of a document, with instances of the corresponding dependent referring expression scattered throughout the document. An anaphoric expression is an expression that re-mentions an entity previously referred to by an antecedent expression. The anaphoric expression and the antecedent expression both refer to something outside of the document, which is the referent.

The illustrative embodiments recognize that in some other cases, the full expression may appear towards the end of a document, with instances of the corresponding dependent referring expression scattered throughout the document. A cataphoric expression is an expression that re-mentions an entity referred to by a subsequent expression. The cataphoric expression and the subsequent expression both refer to something outside of the document, which is the referent.

The illustrative embodiments also recognize that the full expression and the dependent referring expression may not appear in the same document. For example, in a set of one or more documents, such as an agreement document associated with one or more addenda documents, the agreement document may include the full expression, and the agreement document and the addenda documents may include instances of the corresponding dependent referring expression.

The illustrative embodiments recognize that any amount of content in a given document (word distance), and any number of documents in a given set of documents (document distance) can separate an instance of a dependent referring expression from the corresponding full expression. Presently available NLP technology is ineffective or error prone in resolving the meaning of an instance of dependent referring expression unless the corresponding full expression also appears in close proximity of the instance of the dependent referring expression. As an example, some presently available NLP technology is bound to a few sentences or a paragraph within which to resolve the meaning of the dependent referring expression. If the dependent referring expression and the full expression are separated by, for example, more than six lines or a paragraph, such as when they occur several pages apart in a document, some presently available NLP technology simply uses the dependent referring expression without resolving the dependent referring expression to the corresponding full expression.

Other presently available NLP technology may attempt to resolve the dependent referring expression by linking an instance of a dependent referring expression to a previous instance of the dependent referring expression, such as to form a co-referential chain. The illustrative embodiments recognize that even if some existing NLP techniques can resolve dependent referring expressions that occur at great distances from another mention of the same referent, such resolving is prone to errors or inefficiencies due to their dependency on textual searches that traditionally uses combinations of unreliable clues to make a guess about the right antecedent instance of the dependent referring expression.

The illustrative embodiments recognize that these and other present limitations in resolving dependent referring expressions cause problematic natural language processing. Consider the following example sentence in a document— "The 2009 Series C Bonds will be issued under and subject to the terms and conditions contained in a resolution adopted by the County." The dependent referring expression "the 2009 Series C Bonds" refers to a specific bond, and the dependent refer ring expression "the County" refers to a specific county. The subject bond and the subject county of this sentence are not discernible without additional inferences, such as by determining an equality relationship between these phrases and other information provided in another part of the document, or another document in a given set of documents.

Assume that elsewhere in the document, the following sentence appears—"The $60,000,000 General Obligation Public Improvement and School Bonds, 2009 Series B (the "2009 Series B Bonds") and the $60,000,000 General Obligation Public Improvement and School Bonds, 2009 Series C (Federally Taxable-Build America Bonds—Direct Payment) (the "2009 Series C Bonds") (collectively, the "Bonds") of Shelby County, Tennessee (the "County") . . . . " Resolving the dependent referring expressions of the previous sentence properly within the context of the document requires calculating the relationship of the dependent referring expressions to the full expression in the latter sentence.

The illustrative embodiments recognize that presently available NLP technologies fail in analyzing dependent referring expressions within the proper context of the document for a combination of reasons. For example, some NLP technologies fail due to the word distance or document distance between a dependent referring expression instance and a corresponding full expression. Even NLP technologies equipped with anaphoric disambiguation tools are limited by word or document distances.

Some other NLP technologies fail to even recognize certain text as a dependent referring expression instance. For example, where some NLP technologies rely on some linguistic characteristic of the dependent referring expression, such as a singular form, a plural form of the dependent referring expression will not be recognized for resolution. As another example, an anaphoric disambiguation would miss cataphoric dependent referring expression, which are less common than anaphoric references. Other NLP technologies may suffer from a combination of these and other the shortcomings, resulting in resolving some instances of dependent referring expressions but not others.

The illustrative embodiments used to describe the invention generally address and solve the above-described problems and other problems related to the limitations of presently available NLP technology. The illustrative embodiments provide a system, and computer program product for disambiguation of dependent referring expression in natural language processing.

The illustrative embodiments discover the instances of dependent refers expression in a document through a filtration process. The illustrative embodiments locate the corresponding full expression across unlimited word distance or document distance in a given set of documents. The illustrative embodiments disambiguate each instance of dependent referring expression using the full expression.

An embodiment disambiguates an instance of dependent referring expression by replacing the dependent referring expression with the full expression in the output natural language processed document. Another embodiment disambiguates an instance of dependent referring expression by modifying the dependent referring expression in such a manner that the full expression becomes available or accessible from location of the dependent referring expression instance in the output natural language processed document.

For example, using the example sentences described above, one embodiment replaces all instances of "the County" with "Shelby County, Tennessee" in the output document. Another embodiment causes certain instances of "the County" to present an alternate text of "Shelby County, Tennessee" in the output document. Another embodiment causes certain instances of "the County" to include a hyperlink to the occurrence of the phrase "Shelby County, Tennessee" in the output document. Another embodiment causes certain instances of "the County" to include a hyperlink to another document in the given input set of documents pertaining to "Shelby County, Tennessee" in the output document.

These example ways of resolving dependent referring expression to the corresponding full expression are not intended to be limiting on the illustrative embodiments. An embodiment can implement these, or a combination of these and other manners of resolving dependent referring expressions within the scope of the illustrative embodiments.

The illustrative embodiments are described with respect to certain types of documents, full expressions, and dependent referring expressions only as examples. Such types of documents, full expressions, and dependent referring expressions, or their example attributes are not intended to be limiting to the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
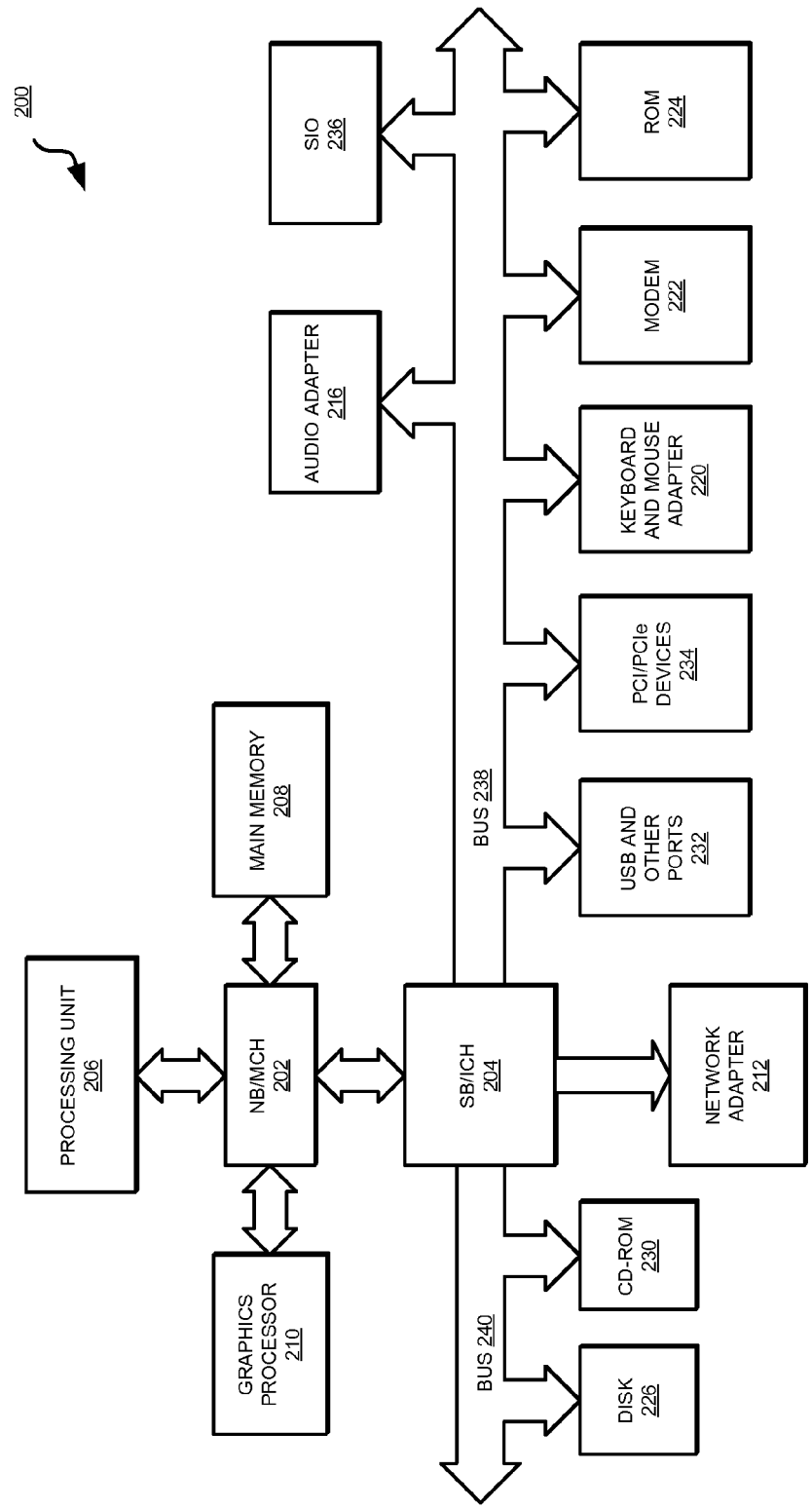
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, Application 105 in server 104 is an implementation of an embodiment described herein. Application 105 operates in conjunction with NLP engine 103. NLP engine 103 may be, for example, an existing application capable of performing natural language processing on documents, and may be modified or configured to operate in conjunction with application 105 to perform an operation according to an embodiment described herein. Client 112 includes set of documents with dependent referring expression 113 that is processed according to an embodiment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 112 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. BOX 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached no the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are non meant no imply architectural limitations. For example, data processing system 200 also may be a tablet computer, laptop computer, or telephone device in addition to taking the form of a PDA.

With reference to FIG. 3, this figure depicts several examples of dependent referring expressions that can be resolved in accordance with an illustrative embodiment. Document 302 is an example single document in which full expression 304 appears before the appearance of dependent referring expression instances 306 and 308. Document 302 is an example document that can be all or part of set of documents 113 in FIG. 1.

Presently available NLP technologies, such as NLP engine 103 in FIG. 1, are able no resolve dependent referring expression instances only when the dependent referring expression instance appears in close proximity with the corresponding full expression. For example, a presently available NLP engine would look at the content within range 310 of dependent referring expression 306 to determine whether dependent referring expression 306 can be resolved. If full expression 304 were to appear within range 310 (not shown), a presently available NLP engine might resolve dependent referring expression 306, subject to other conditions and imitations. In the depicted example of document 302, a presently available NLP engine would not resolve dependent referring expression 306 using full expression 304.

Document 312 is another example singles document in which full expression 314 appears aster the appearance of dependent referring expression instances 316 and 318. A presently available NLP engine might not resolve dependent referring expression 306, owing to a combination of limitations described earlier.

Documents 322 and 323 are example documents in a set of documents, such as set of documents with dependent referring expression 113 in FIG. 1. Document 322 includes full expression 324 and dependent referring expression 326. Document 323 includes dependent referring expressions 328 and 330, which can be resolved using full expression 324 in document 322. A presently available NLP engine might not resolve dependent referring expression 306, owing to a combination of limitations described earlier. Various embodiments described herein are usable for resolving dependent referring expressions 306 and 308 to full expression 304, dependent referring expressions 316 and 318 to full expression 314, and dependent referring expressions 326, 328, and 330 to full expression 324.

Figure 4:
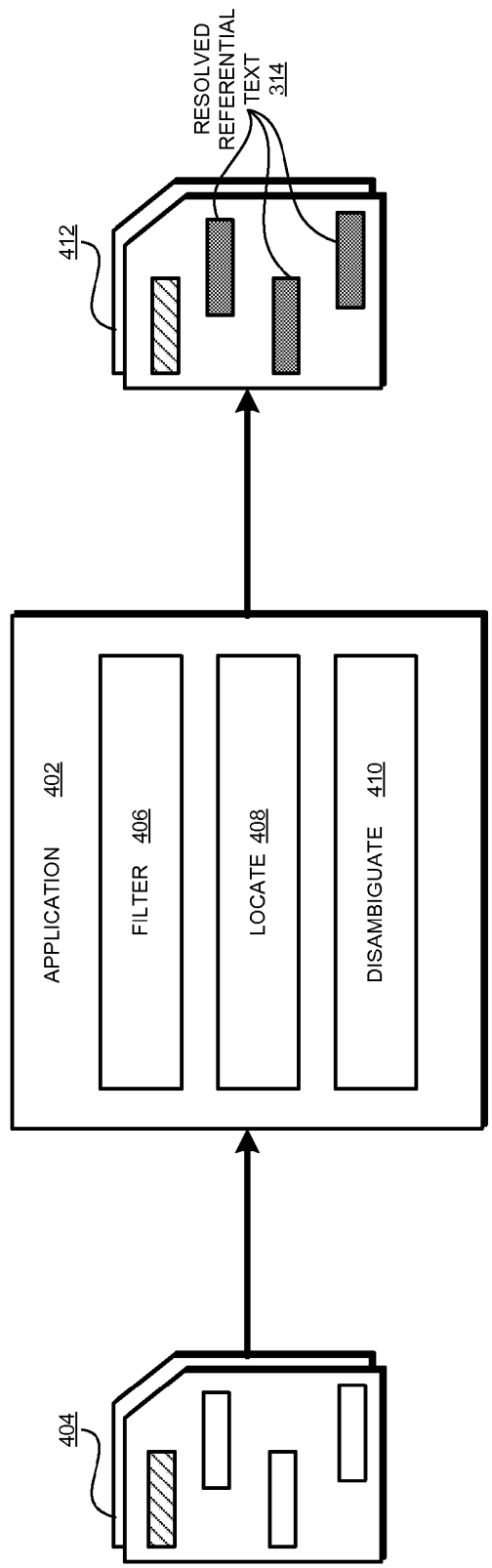
FIG. 4 depicts a block diagram of an example configuration for disambiguation of dependent referring expression in natural language processing in accordance with an illustrative embodiment.

With reference to FIG. 4, this figure depicts a block diagram of an example configuration for disambiguation of dependent referring expression in natural language processing in accordance with an illustrative embodiment. Application 402 is an example embodiment of application 105 in FIG. 1. Any of document 302, document 304, or documents 322 and 323 in FIG. 3 can be used as set of documents 404, which includes a set of one or more full expressions and a set of one or more dependent referring expressions corresponding to each full expression in the set.

Application 402 receives set of documents 404 as input for natural language processing. Component 406 selects a portion of documents 404. Component 406 filters the portion to recognize an instance of dependent referring expression. For example, in one embodiment, component 406 recognizes an instance of dependent referring expression by recognizing certain linguistic characteristics of the words, phrases, or text segments. For example, in one embodiment, component 406 filters the selected portion of a document for capitalized words and recognizes a capitalized word as an instance of dependent referring expression. In another embodiment, component 406 filters for certain strings of characters and recognizes them as dependent referring expressions.

In another embodiment, component 406 further filters the selected portion for other forms of the recognized dependent referring expression, such as a singular or plural form, different gender form, different tense form, possessive, adjective, adverbial, or other grammatical form of the recognized dependent referring expression. As an example, if component 406 recognizes "County" as an instance of dependent referring expression due to capitalization, component 406 also recognizes "County's" as another instance of the same dependent referring expression.

Component 408 locates in the entire scope of set of documents 404 full expression instance that corresponds to a recognized dependent referring expression. For example, having recognized the capitalized word "County" as an instance of dependent referring expression, component 408 locates a full expression where the capitalized, word "County" is stated to stand-in for the full expression.

Component 410 disambiguates or resolves a dependent referring expression instance using the corresponding full expression located by component 408. For example, in one embodiment, component 410 replaces an instance of dependent referring expression with the corresponding full expression.

In another example embodiment, component 410 modifies the instance of the dependent referring expression so that the full expression or equivalent disambiguation information is available at or from the location of the instance of the dependent referring expression. In another example embodiment, component 410 modifies the instance of the dependent referring expression by adding extra markup in the document, e.g., HTML tags, which would facilitate visual clues and/or navigation to the full expression from the location of the instance of the dependent referring expression. Without implying a imitation thereto, some more example manners of disambiguating a dependent referring expression instance are described elsewhere in this disclosure.

Application 402 produces set of documents 412, which includes resolved dependent referring expressions 314. A resolved instance in resolved dependent referring expressions 314 can take any of the various example forms described herein, and any other similarly purposed form, which will become apparent from this disclosure to those of ordinary skill in the art, and which are contemplated within the scope of the illustrative embodiments.

Figure 5:
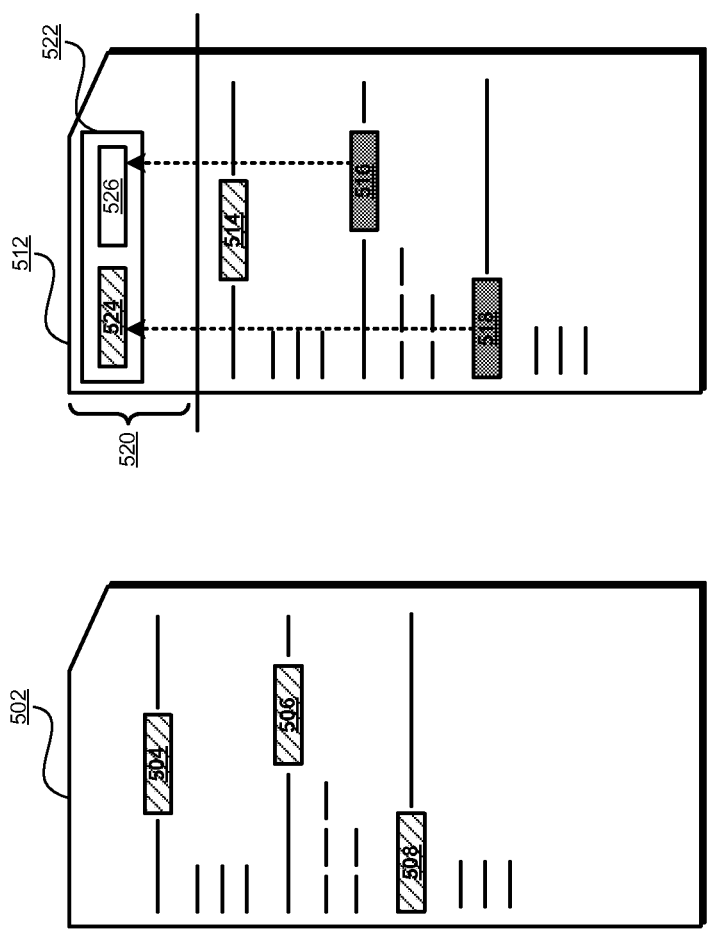
FIG. 5 depicts examples of disambiguation of dependent referring expression in natural language processing in accordance with an illustrative embodiment.

With reference to FIG. 5, this figure depicts examples of disambiguation of dependent referring expression in natural language processing in accordance with an illustrative embodiment. Document 502 is an example of a document in documents 412 in FIG. 4.

Full expression 504 is the original occurrence of a full expression in document 502. Dependent referring expressions 506 and 508 are resolved instances of dependent referring expression that occurred in an original version of document 502 (not shown), such as in a document in documents 404 in FIG. 4.

In one embodiment, an application, such as application 402 using component 410 in FIG. 4, resolves instances of dependent referring expression 506 and 508 by replacing instances 506 and 508 with copies of full expression 504. The replacement method of resolving dependent referring expression instances is indicated by the similar shading of the blocks representing full expression 504, and dependent referring expressions 506 and 508.

Document 512 is another example of a document in documents 412 in FIG. 4.

Full expression 514 is the original occurrence of a full expression in document 512. Dependent referring expressions 516 and 518 are resolved instances of dependent referring expression that occurred in an original version of document 512 (not shown), such as in a document in documents 404 in FIG. 4.

In one embodiment, an application, such as application 402 using component 410 in FIG. 4, resolves instances of dependent referring expression 516 and 518 by modifying instances 516 and 518 such that information about full expression 514 becomes available or accessible from the locations of instances 516 and 518. The replacement method of resolving dependent referring expression instances is indicated by the different shading of the blocks representing full expression 514, and dependent referring expressions 516 and 518.

Such an embodiment creates or modifies section 520 of document 512, such as, for example, a metadata section. The embodiment adds entry 522 to section 520. Entry 522 includes a mapping of copy 524 of full expression 514 to copy 526 of the dependent referring expression, such as instance 516 or 518. For example, if instances 516 and 518 are similar to one another, any one of those instances participates in entry 520. If instances 516 and 518 are distinct from one another, both instances participate (not shown) in entry 520.

In one embodiment, instances 516 and 518 in document 512 link to entry 520 such that an interaction, such as clicking or pointing with a pointing device at the location of instance 516 or 518 presents the information from entry 520 to a user in another embodiment, the linking between instance 516 or 518 and entry 520 enable another application, such as NLP engine 103 in FIG. 1, to replace the instances with the corresponding full expression at a later processing stage.

Figure 6:
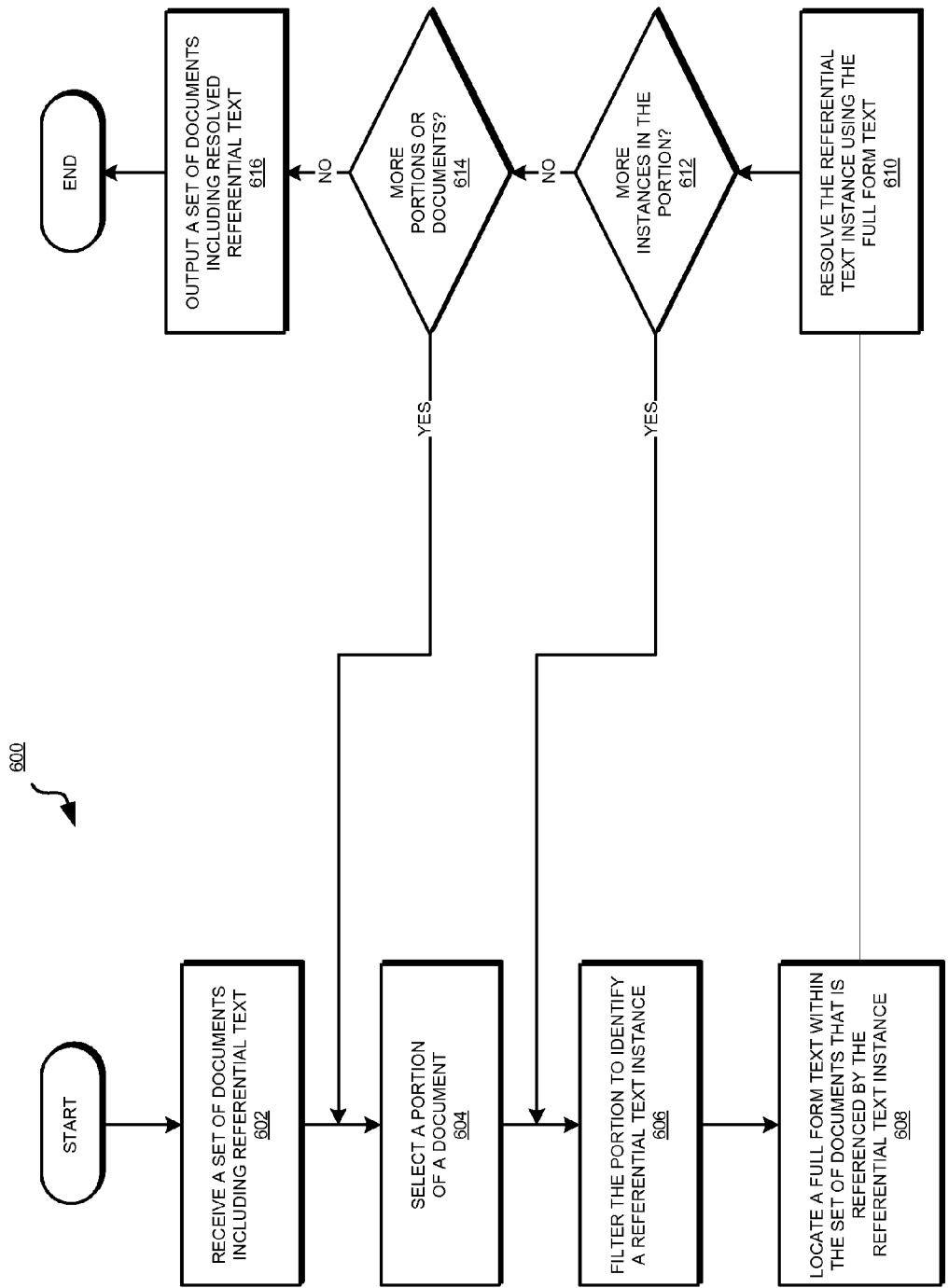
FIG. 6 depicts a flowchart of an example process of disambiguation of dependent referring expression in natural language processing in accordance with an illustrative embodiment.

With reference to FIG. 6, this figure depicts a flowchart of an example process of disambiguation of dependent referring expression in natural language processing in accordance with an illustrative embodiment. Process 600 can be implemented in application 402 in FIG. 4.

Process 600 begins by receiving a set of documents including dependent referring expression (step 602). Process 600 selects a portion of a document in the received set (step 604).

Process 600 filters the portion to identify a dependent referring expression instance (step 606). Process 600 locates a full expression within the set of documents where the identified dependent referring expression instance references the full expression (step 608). Process 600 resolves the dependent referring expression using the full expression (step 610).

Process 600 determines whether more instances of dependent referring expression are present in the selected portion (step 612). If more instances of the same or different dependent referring expression are present ("Yes" path of step 612, process 600 returns to step 606 and identifies another instance. If no more instances of dependent referring expressions are present in the section ("No" path of step 612), process 600 determines whether more portions or documents remain to be disambiguated in a similar manner (step 614).

If more portions or documents remain ("Yes" path of step 614), process 600 returns to step 604 and selects another portion in the same or different document in the received set. If no more portion or documents remain to be disambiguated ("No" path of step 614), process 600 outputs a set of documents including resolved dependent referring expression instances (step 616). Process 600 ends thereafter.

With reference to FIG. 7, this figure depicts a flowchart of one example manner of resolving a dependent referring expression instance in accordance with an illustrative embodiment. Process 700 can be implemented as step 610 of process 600 in FIG. 6.

Process 700 begins by replacing a dependent referring expression instance with the corresponding full expression (step 702). Process 700 ends thereafter.

With reference to FIG. 8, this figure depicts a flowchart of one example manner of resolving a dependent referring expression instance in accordance with an illustrative embodiment. Process 800 can be implemented as step 610 of process 600 in FIG. 6.

Process 800 begins by modifying a dependent referring expression instance such that information about the corresponding full expression is available or accessible from the location of the dependent referring expression instance in the document (step 802). Process 800 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a system, and computer program product are provided in the illustrative embodiments for disambiguation of dependent referring expression in natural language processing. An embodiment resolves dependent referring expression instances to their corresponding full expression such that each instance of the dependent referring expression in an output document of an embodiment is modified to indicate the full expression to which it refers in an input document. An embodiment can disambiguate dependent referring expression instances across a set of any number of documents, such as where natural language processing of the cumulative contents of the set of documents is to be performed after an embodiment has acted on the set. The set of documents serving as input to an embodiment excludes a lexicon, an ontology, a knowledge-base, a database, or a repository, which is generally purposed for translating documents.

Disambiguation of dependent referring expression using an embodiment allows a downstream document processing component, such as a NLP engine, to use the full expression without needing to know how to use or resolve dependent referring expression instances. An embodiment improves the utility of the disambiguated document for various document processing tasks. For example, many information retrieval and summarization tasks are based on word frequency counts. An embodiment produces a document in which the number of mentions of the full expression, e.g. Shelby County, Tennessee, increases, thus boosting the quantitative characterization of the document as being 'about' Shelby County, Tennessee, resulting in improved precision of applications that rely on word frequencies. For example, the output document of an embodiment is more likely to be calculated as relevant to a query containing the term "Shelby County" than the input document to an embodiment that refers to "Shelby County" as "the County".

As another example, many language processing tasks distinguish between common words and more precise words that carry more power to differentiate one document from another. An embodiment for disambiguation can substitute generic terms, e.g. "The Bonds", with less generic and more informative corresponding terms, improving a system's ability to characterize the semantic content of the output document better than the input document.

As another example, language processing tasks, such as passage retrieval, match text of a document to a user's query, and then display a fixed-size window of words from the document to the user so that the user can determine whether the document does indeed contain the desired information. Presenting more specific text, e.g., "Shelby County, Tennessee", as in an example output document of an embodiment, rather than the ambiguous text "the County" in an input document of an embodiment, makes the word window more revealing of the content of the document, and therefore more useful to the user.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device (s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer usable program product comprising a computer usable storage device including computer usable code for disambiguation of dependent referring expression in natural language processing, the computer usable code comprising:

computer usable code for selecting a portion of a document in a set of documents, the portion including a set of dependent referring expression instances;

computer usable code for filtering the portion to identify an instance from a set of dependent referring expression instances by using a linguistic characteristic of the instance, the instance of dependent referring expression referring to a full expression, the full expression occurring in another document in the set of documents;

computer usable code for locating the full expression in one member document in the set of documents by locating where the dependent referring expression is defined to be a stand-in for the full expression; and computer usable code for resolving, using a processor and a memory, the instance using the full expression such that information about the full expression is available at a location of the instance, wherein the computer usable code for resolving comprises:

computer usable code for modifying the instance by adding data at a location of the instance, such that the data makes the information about the full expression accessible from the location of the instance;

computer usable code for modifying the document to produce a second document, wherein the second document includes a mapping between the instance and the full expression in a metadata section of the second document, the metadata section being distinct from a location of the instance; and computer usable code for linking the instance to the mapping using a link, wherein the link is usable to make the information about the full expression accessible from the location of the instance.

2. The computer usable program product of claim 1, further comprising:

computer usable code for outputting a second set of documents corresponding to the set of documents, wherein a document in the second set of document corresponds to the document in the set of documents, and wherein the document in the second set of documents includes a modified form of the instance responsive to the resolving.

3. The computer usable program product of claim 1, wherein the computer usable code for resolving comprises:

computer usable code for replacing the instance with a copy of the full expression.

4. The computer usable program product of claim 1, wherein none of the documents in the set of documents is a generally purposed repository usable for translating a document not in the set of documents.

5. The computer usable program product of claim 1, wherein the set of documents is configured for natural language processing of cumulative contents of the set of documents.

6. The computer usable program product of claim 1, wherein the computer usable code is stored in a computer readable storage medium in a data processing system, and wherein the computer usable code is transferred over a network from a remote data processing system.

7. The computer usable program product of claim 1, wherein the computer usable code is stored in a computer readable storage medium in a server data processing system, and wherein the computer usable code is downloaded over a network to a remote data processing system for use in a computer readable storage medium associated with the remote data processing system.

8. A data processing system for disambiguation of dependent referring expression in natural language processing, the data processing system comprising:

a storage device including a storage medium, wherein the storage device stores computer usable program code; and a processor, wherein the processor executes the computer usable program code, and wherein the computer usable program code comprises:

computer usable code for selecting a portion of a document in a set of documents, the portion including a set of dependent referring expression instances;

computer usable code for filtering the portion to identify an instance from a set of dependent referring expression instances by using a linguistic characteristic of the instance, the instance of dependent referring expression referring to a full expression, the full expression occurring in another document in the set of documents;

computer usable code for locating the full expression in one member document in the set of documents by locating where the dependent referring expression is defined to be a stand-in for the full expression; and computer usable code for resolving, using a processor and a memory, the instance using the full expression such that information about the full expression is available at a location of the instance, wherein the computer usable code for resolving comprises:

computer usable code for modifying the instance by adding data at a location of the instance, such that the data makes the information about the full expression accessible from the location of the instance;

computer usable code for modifying the document to produce a second document, wherein the second document includes a mapping between the instance and the full expression in a metadata section of the second document, the metadata section being distinct from a location of the instance; and computer usable code for linking the instance to the mapping using a link, wherein the link is usable to make the information about the full expression accessible from the location of the instance.

* * * * *